(12) United States Patent
Inoue et al.

(10) Patent No.: US 11,865,529 B2
(45) Date of Patent: Jan. 9, 2024

(54) HONEYCOMB STRUCTURE AND ELECTRICALLY HEATING SUPPORT

(71) Applicant: NGK INSULATORS, LTD., Nagoya (JP)

(72) Inventors: Takayuki Inoue, Nagoya (JP); Makoto Hamazaki, Nagoya (JP); Kohei Yamada, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 17/575,812

(22) Filed: Jan. 14, 2022

(65) Prior Publication Data
US 2022/0297103 A1    Sep. 22, 2022

(30) Foreign Application Priority Data
Mar. 16, 2021   (JP) .................. 2021-042752

(51) Int. Cl.
*B01J 21/06* (2006.01)
*B01J 21/08* (2006.01)
*B01J 21/18* (2006.01)
*B01J 35/04* (2006.01)
*H05B 3/00* (2006.01)
*H05B 3/14* (2006.01)

(52) U.S. Cl.
CPC .............. *B01J 35/04* (2013.01); *B01J 21/18* (2013.01); *H05B 3/0004* (2013.01); *H05B 3/141* (2013.01); *H05B 2203/016* (2013.01)

(58) Field of Classification Search
CPC . B01J 21/06; B01J 21/08; B01J 21/18; H05B 3/0004; H05B 35/04; H05B 3/141
See application file for complete search history.

(56) References Cited

U.S. PATENT DOCUMENTS

| | | | |
|---|---|---|---|
| 6,352,756 B1 * | 3/2002 | Ichikawa | F01N 3/2828 428/116 |
| 7,041,359 B2 * | 5/2006 | Hijikata | B01D 46/2478 428/116 |
| 7,052,760 B2 * | 5/2006 | Hijikata | B01J 35/04 428/116 |
| 7,294,316 B2 * | 11/2007 | Harada | C04B 35/10 428/116 |
| 7,344,770 B2 * | 3/2008 | Hirai | B01D 53/9454 428/116 |

(Continued)

FOREIGN PATENT DOCUMENTS

JP    5735428 B2    6/2015
JP    2020-204300 A    12/2020

*Primary Examiner* — Cam N. Nguyen
(74) *Attorney, Agent, or Firm* — BURR PATENT LAW, PLLC

(57) ABSTRACT

A ceramic honeycomb structure includes: an outer peripheral wall; and a partition wall disposed on an inner side of the outer peripheral wall, the partition wall defining a plurality of cells, each of the plurality of cells to form a fluid flow path extending from one end face to other end face. The honeycomb structure contains: 1) particles including one or more selected from silicon carbide, silicon nitride and aluminum nitride; and 2) silicon doped with a dopant. The dopant is a Group 13 element or a Group 15 element. The honeycomb structure has a silicon content (B) of from 20 to 80% by mass, and the honeycomb structure has a porosity of 30% or less.

8 Claims, 2 Drawing Sheets

(56) References Cited

U.S. PATENT DOCUMENTS

| | | | | |
|---|---|---|---|---|
| 7,387,657 | B2 * | 6/2008 | Kunieda | C04B 38/0006 428/116 |
| 7,396,576 | B2 * | 7/2008 | Masukawa | B01D 46/2429 428/116 |
| 7,504,359 | B2 * | 3/2009 | Ogyu | B01D 53/94 502/527.19 |
| 7,534,482 | B2 * | 5/2009 | Yoshida | B01D 53/885 55/482 |
| 7,541,006 | B2 * | 6/2009 | Yoshida | B01D 46/2429 422/180 |
| 7,678,439 | B2 * | 3/2010 | Ichikawa | B01D 46/249 428/116 |
| 8,722,172 | B2 * | 5/2014 | Sendo | B01D 46/24492 428/116 |
| 8,859,075 | B2 * | 10/2014 | Kaneda | C04B 35/6316 428/116 |
| 9,023,453 | B2 * | 5/2015 | Ido | C04B 38/0074 428/116 |
| 9,188,044 | B2 * | 11/2015 | Aoki | B01J 35/0006 |
| 9,303,543 | B2 * | 4/2016 | Aoki | B01J 35/0006 |
| 9,346,043 | B2 * | 5/2016 | Hirose | B01J 35/1023 |
| 9,464,551 | B2 * | 10/2016 | Hirose | B01D 46/2484 |
| 9,956,739 | B2 * | 5/2018 | Aoki | B01D 46/247 |
| 10,040,016 | B1 * | 8/2018 | Iida | B01J 35/04 |
| 10,369,545 | B2 * | 8/2019 | Yamamoto | F01N 3/2828 |
| 10,653,998 | B2 * | 5/2020 | Yamamoto | B01D 46/24491 |
| 11,369,952 | B2 * | 6/2022 | Miyairi | B01D 46/2459 |
| 2001/0033910 | A1 * | 10/2001 | Ikeshima | C04B 38/0006 428/116 |
| 2004/0235659 | A1 * | 11/2004 | Abe | B01D 53/94 502/439 |
| 2006/0037297 | A1 * | 2/2006 | Hijikata | B01D 46/247 55/523 |
| 2012/0183725 | A1 | 7/2012 | Noguchi et al. | |
| 2020/0400057 | A1 | 12/2020 | Inoue et al. | |
| 2021/0260570 | A1 * | 8/2021 | Konno | B01D 46/2466 |
| 2021/0291102 | A1 * | 9/2021 | Yuki | F01N 3/0222 |
| 2021/0293166 | A1 * | 9/2021 | Miyairi | F01N 3/2828 |
| 2021/0299603 | A1 * | 9/2021 | Sendo | B01D 46/24492 |
| 2021/0346880 | A1 * | 11/2021 | Miyairi | B01J 35/04 |
| 2022/0118391 | A1 * | 4/2022 | Ichikawa | B01J 35/04 |
| 2022/0362704 | A1 * | 11/2022 | Hosoda | B01J 35/04 |
| 2022/0410136 | A1 * | 12/2022 | Ichikawa | B01J 23/8472 |

* cited by examiner

HONEYCOMB STRUCTURE AND ELECTRICALLY HEATING SUPPORT

FIELD OF THE INVENTION

The present invention relates to a honeycomb structure and an electrically heating support.

BACKGROUND OF THE INVENTION

An electrically heated catalyst (EHC) is a system for increasing a temperature of a catalyst supported on the EHC to its active temperature before an engine starts, by arranging electrodes on a honeycomb structure made of conductive ceramics, and heating the honeycomb structure itself by current conduction.

Since various voltages are used in a power supply for the EHC, the EHC substrate resistance needs to be matched to the target resistance in order to fit the voltage used.

Patent Literature 1 discloses an EHC that uses a honeycomb structure formed of a Si—SiC material. The Si and SiC have slightly higher volume resistivity. Therefore, even if the honeycomb structure as described in Patent Literature 1 is used for the EHC used under a higher voltage of from 200 to 500 V, the volume resistivity can be adjusted within a resistance range of from about several Ωcm to 200 Ωcm. As a result, when used under a higher voltage of from 200 to 500 V, it can suppress an excessive current to flow.

A very wide range of voltages is used for the power supply for the EHC depending on types of motor vehicles to be mounted and the like. In particular, when a lower voltage of 60 V or less, for example 48 V, is used as the power supply for the EHC, it is necessary to adjust the volume resistivity within a resistance range of the order of 0.1 Ωcm in order to suppress generation of an excessive current. To address such a problem, Patent Literature 2 proposes a honeycomb structure that can satisfactorily suppress generation of excessive current even if it is used under a lower voltage, by forming the honeycomb structure from ceramics containing Si, and controlling a Si content of the ceramics and a dopant concentration in Si.

CITATION LIST

Patent Literatures

[Patent Literature 1] Japanese Patent No. 5735428 B
[Patent Literature 2] Japanese Patent Application Publication No. 2020-204300 A

SUMMARY OF THE INVENTION

However, the Si—SiC material used in the honeycomb structure described in Patent Literature 1 has a higher volume resistivity, and there is room for improvement for low-voltage EHC applications. Further, the Si-containing ceramic material having a predetermined dopant concentration, which is used in the honeycomb structure described in Patent Literature 2, has lower thermal shock resistance, and there is room for improvement.

The present invention was made in view of the above problems. An object of the present invention is to provide a honeycomb structure and an electrically heating support, which have low resistance and good thermal shock resistance.

The above problems are solved by the present invention as described below, and the present invention is specified as follows:

A. A ceramic honeycomb structure, comprising: an outer peripheral wall; and a partition wall disposed on an inner side of the outer peripheral wall, the partition wall defining a plurality of cells, each of the plurality of cells to form a fluid flow path extending from one end face to other end face,
wherein the honeycomb structure contains:
1) particles comprising one or more selected from silicon carbide, silicon nitride and aluminum nitride; and
2) silicon doped with a dopant,
wherein the dopant is a Group 13 element or a Group 15 element, and
wherein the honeycomb structure has a silicon content (B) of from 20 to 80% by mass, and the honeycomb structure has a porosity of 30% or less.

B. An electrically heating support, comprising:
the honeycomb structure described in the above A;
a pair of electrode portions provided on a surface of the outer peripheral wall of the honeycomb structure; and
metal terminals provided on the pair of electrode portions.

According to the present invention, it is possible to provide a honeycomb structure and an electrically heating support, which have low resistance and good thermal shock resistance.

DETAILED DESCRIPTION OF THE INVENTION

Hereinafter, embodiments of a honeycomb structure, an electric heating type honeycomb structure, an electric heating type support, and an exhaust gas purifying device according to the present invention will be described with reference to the drawings. However, the present invention is not limited to the embodiments, and various changes, modifications, and improvements may be added without departing from the scope of the present invention, based on knowledge of one of ordinary skill in the art.

<Honeycomb Structure>

Figure 1:
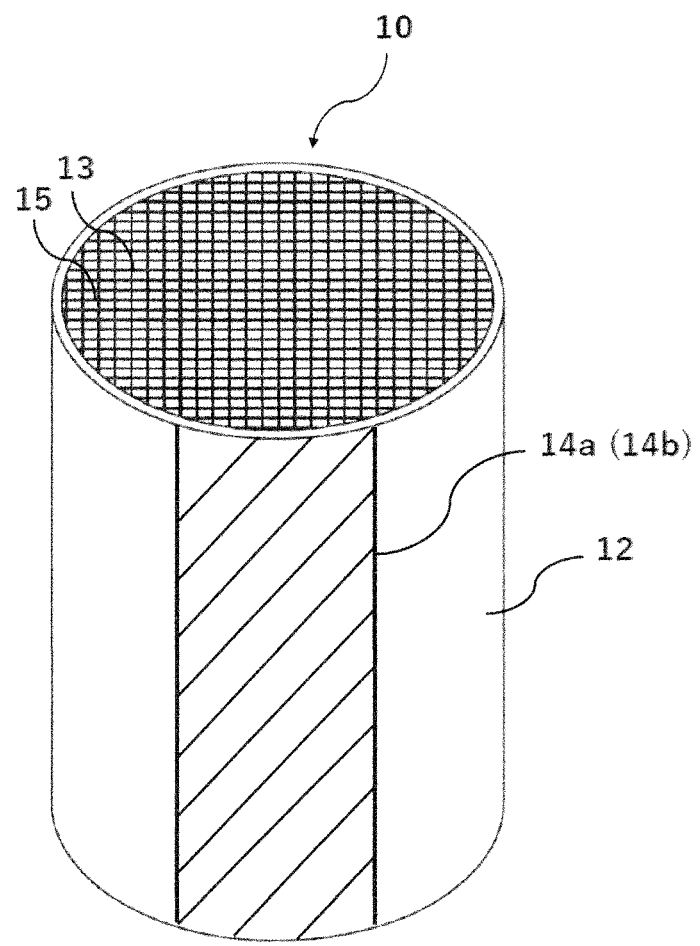
FIG. 1 is a schematic external view of a honeycomb structure according to an embodiment of the present invention.

FIG. 1 is a schematic external view of a honeycomb structure according to an embodiment of the present invention. A honeycomb structure 10 is made of ceramics, and includes: an outer peripheral wall 12; and a partition wall 13 disposed on an inner side of the outer peripheral wall 12, the partition wall 13 defining a plurality of cells 15, each of the cells 15 extending from one end face to other end face to form a fluid flow path. The honeycomb structure 10 is formed in a pillar shape. Further, the honeycomb structure 10 has a pair of electrode portions 14a, 14b arranged on a surface of the outer peripheral wall 12 so as to face each other across a central axis of the honeycomb structure 10. The electrode portions 14a, 14b may not be provided.

The honeycomb structure 10 contains: particles including one or more selected from silicon carbide, silicon nitride, and aluminum nitride; and silicon doped with a dopant. The particles of each of silicon carbide, silicon nitride, and aluminum nitride can function as aggregate particles for the honeycomb structure 10, thus providing a rigid honeycomb structure 10. In particular, the main component of the particles is preferably silicon carbide, because it has a higher thermal conductivity and a smaller difference between thermal expansion coefficients of silicon carbide and silicon. The phrase "the main component of the particles is silicon carbide" means that the particles contain 80% or more of silicon carbide (total mass), and more preferably 90% or more, relative to the total component.

The dopant in silicon contained in the honeycomb structure 10 is a Group 13 element or a Group 15 element. The Group 13 or Group 15 element can be easily contained as a dopant in silicon in the concentration range of from $1 \times 10^{16}$ to $5 \times 10^{20}/cm^3$, as described below. As used herein, the Group 13 element refers to boron (B), aluminum (Al), gallium (Ga), indium (In), or the like, and the Group 15 element refers to nitrogen (N), phosphorus (P), arsenic (As), antimony (Sb), bismuth (Bi) or the like. A plurality of types of elements may be contained as long as the dopants in silicon contained in the honeycomb structure are elements belonging to the same group, because they can exhibit conductivity without being affected by counter doping. It is more preferable that one or two dopants selected from B and Al are used. It is also preferable that one or two dopants selected from N and P are used. The B, Al, N and P can be more easily contained as dopants in silicon in the concentration range of from $1 \times 10^{16}$ to $5 \times 10^{20}/cm^3$.

The concentration of the dopant in silicon contained in the honeycomb structure 10 is preferably $1 \times 10^{16}$ to $5 \times 10^{20}/cm^3$. The control of the concentration of the dopant in silicon contained in the honeycomb structure 10 in such a range can reduce the volume resistivity of the honeycomb structure 10. The concentration of the dopant in silicon contained in the honeycomb structure 10 can be adjusted as needed depending on a desirable volume resistivity of the honeycomb structure 10. In general, as the concentration of the dopant in silicon increases, the volume resistivity of the honeycomb structure 10 decreases, and as the concentration of the dopant in silicon decreases, the volume resistivity of the honeycomb structure 10 increases. The present inventors have found that the volume resistivity of the honeycomb structure 10 can be effectively decreased by doping with silicon as a simple substance, rather than a silicon compound such as silicon carbide, silicon nitride and aluminum nitride which function as aggregate particles as described above. The concentration of the dopant in silicon is more preferably from $5 \times 10^{17}$ to $5 \times 10^{20}/cm^3$.

The concentration of the dopant in silicon contained in the honeycomb structure 10 can be measured, for example, by the following method. Hereinafter, a case where boron is contained as a dopant will be described. However, it should be noted that dopants other than boron can be measured by the same method.

First, the honeycomb structure is cut along a surface perpendicular to a central axis to expose a cut surface. Irregularities on a cross section of the honeycomb structure are then filled with a resin, and the surface filled with the resin is further polished. The polished surface of the honeycomb structure is then observed, and elemental analysis of a material forming the honeycomb structure is carried out by energy dispersive X-ray spectroscopy (EDX analysis: Energy Dispersive X-ray Spectroscopy).

Subsequently, for a portion of the polished surface which has been determined to be "silicon", whether or not "other elements" are contained in the silicon is determined by the following method. First, for portions where the silicon element has been detected, a portion where elements other than silicon have been detected is determined as "other components" by mapping of a cross-sectional structure photograph and an electron probe micro analyzer (EPMA analysis: Electron Probe Micro Analyzer) for the polished surface. The "other elements" include boron, and metal borides or borides present in silicon as boron sources.

Subsequently, the portion where the silicon element alone or silicon and boron has/have been detected by the EPMA analysis and it has been determined as "silicon", an amount of boron in silicon is identified by the following method. First, the honeycomb structure including the portion determined as "silicon" is cut into a thickness having a few millimeters, and the cut honeycomb structure is subjected to a cross-section preparation using a Broad Ion Beam method, thereby preparing a sample for measuring the amount of boron. The Broad Ion Beam method is a method for preparing a sample cross section using an argon ion beam. More particularly, it refers to a method for preparing a sample cross section along an end face of a shielding plate by placing the shielding plate directly above the sample, and etching the sample by irradiating it with a broad ion beam of argon from an upper side of the shielding plate. The sample subjected to the cross-sectional preparation is then analyzed for boron in silicon by Time-of-Flight Secondary Ion Mass Spectrometry (TOF-SIMS). In the time-of-flight secondary ion mass spectrometry, the sample is firstly irradiated with a primary ion beam to emit secondary ions from the surface of the sample. The emitted secondary ions are then introduced into a time-of-flight ion mass spectrometer to obtain a mass spectrum of the outermost surface of the sample. The sample is then analyzed based on the obtained mass spectrum, and a concentration of boron in silicon (number/$cm^3$) is determined by converting it based on correlation between a spectral intensity of boron in silicon and measured concentration values previously measured (e.g., a calibration curve).

The silicon contained in the honeycomb structure 10 is preferably present as a continuous layer. Such a configuration can lead to easy control to lower volume resistivity. As used herein, the presence of silicon as a continuous layer refers to a matrix-domain structure in which particles of the above silicon carbide or the like are the domain and silicon is the matrix.

The silicon content in the honeycomb structure 10 is from 20 to 80% by mass. The silicon content in the honeycomb structure 10 of 20% by mass or more can allow a structure in which the doped silicon having lower resistance is microscopically arranged in series to be easily taken. As a result, the volume resistivity of the honeycomb structure 10 can be decreased, and the generation of the excess current can be satisfactorily suppressed even if it is used for a lower voltage of 60 V or less such as 48 V. Further, such a configuration can provide a higher ratio of strength and Young's modulus of the honeycomb structure 10, so that the thermal shock resistance can be improved. The silicon content in the honeycomb structure 10 of 80% by mass or less can provide the honeycomb structure with shape stability. The silicon content in the honeycomb structure 10 is more preferably from 30 to 80% by mass, and even more preferably from 40 to 80% by mass.

As a method for calculating the content of silicon in the honeycomb structure 10 includes, for example, the following method. In the following method, a calculation method when silicon and silicon carbide are used as ceramic raw materials will be described. When silicon and silicon carbide are used as ceramic raw materials, the composition of the formed honeycomb structure is composed of silicon (Si), silicon carbide (SiC), and silicon dioxide ($SiO_2$). For the compositional amounts of Si, SiC, and $SiO_2$ in the honeycomb structure, the amounts of silicon elements and oxygen elements can be measured by a fluorescent X-ray method, and the amounts of carbon elements can be measured by a resistance heating type infrared absorption method. For the amount of SiC, assuming that the carbon elements are all based on SiC, the amount of SiC in the honeycomb structure is calculated by molecular weight calculation. For the amount of $SiO_2$, assuming that the oxygen elements are all based on $SiO_2$, the amount of $SiO_2$ in the honeycomb structure is calculated by molecular weight calculation. The amount of Si can be calculated from the amounts of silicon elements in accordance with the fluorescent X-ray method by subtracting the amount of Si obtained by summing the amount of Si in the SiC and the amount of Si in the $SiO_2$ based on the amount of SiC and the amount of $SiO_2$ calculated above, from the total amount of the silicon elements. When a material other than silicon carbide is used as the ceramic raw material, the composition of the formed honeycomb structure may be confirmed, and amounts of the elements may be then measured by a fluorescent X-ray method or a resistance heating type infrared absorption method to calculate it.

It is preferable that 80% by mass or more of the total mass of the honeycomb structure 10 excluding the silicon content is particles containing at least one selected from silicon carbide, silicon nitride and aluminum nitride as described above. Such a configuration can provide higher thermal conductivity and good thermal shock resistance. It is more preferable that 90% by mass or more, even more preferably 95% by mass of more, of the total mass of the honeycomb structure 10 excluding the silicon content is those particles.

The silicon contained in the honeycomb structure 10 may contain impurities, which are Al and Fe. In this case, the contents of the impurities Al and Fe in the silicon contained in the honeycomb structure 10 are preferably less than 2% by mass of silicon, respectively. When the contents of the impurities Al and Fe in the silicon contained in the honeycomb structure 10 are 2% by mass or less of silicon, respectively, a variation in the shape of the honeycomb structure 10 during production can be well controlled. The contents of the impurities Al and Fe in the silicon contained in the honeycomb structure 10 are more preferably 1% by mass or less, and even more preferably 0.1% by mass or less.

In an embodiment of the present invention, when the silicon contained in the honeycomb structure 10 contains impurities, the impurities are present in a form that adheres to the silicon. On the other hand, in an embodiment of the present invention, when the silicon contained in the honeycomb structure 10 contains a dopant, the dopant is present in a dissolved form in the silicon particles.

The porosity of the honeycomb structure 10 is controlled to be 30% or less. The porosity of the honeycomb structure of 30% or less can improve thermal conductivity, thereby improving thermal shock resistance. The porosity of the honeycomb structure 10 is preferably 20% or less, and more preferably 10% or less. The lower limit of the porosity of the honeycomb structure 10 is theoretically 0% or more. The porosity of the honeycomb structure 10 is a value measured by a mercury porosimeter.

The thermal conductivity of the honeycomb structure 10 is preferably 30 W/m·K or more. Such a configuration can provide the honeycomb structure 10 with good thermal shock resistance. The thermal conductivity of the honeycomb structure 10 is more preferably 50 W/m·K or more, and even more preferably 70 W/m·K or more.

The volume resistivity of the honeycomb structure 10 may be set as needed, depending on to an applied voltage, and is not particularly limited. For example, it may be from 0.001 to 100 Ω·cm. For higher voltages greater than 60 V, it can be from 2 to 100 Ω·cm, and typically from 5 to 100 Ω·cm. For lower voltages of 60 V or less such as 48 V, the volume resistivity can be from 0.001 to 2 Ω·cm, and typically from 0.001 to 1 Ω·cm, and more typically from 0.01 to 1 Ω·cm. More particularly, when the concentration of the dopant in silicon contained in the honeycomb structure is from $1 \times 10^{16}$ to $5 \times 10^{20}/cm^3$, the volume resistivity of the honeycomb structure 10 can be decreased such that an excess current is not generated even if it is used for a lower voltage of 60 V or less such as 48 V. Further, the volume resistivity of the honeycomb structure may be 0.01 Ω·cm or more and 5 Ω·cm or less. When the volume resistivity is 5 Ω·cm or less, the generation of the excess current can be satisfactorily suppressed even under a lower voltage of 48V. On the other hand, if the volume resistivity is more than 5 Ω·cm, the generation of the excess current cannot be sufficiently suppressed under a lower voltage of 48V.

The outer shape of the honeycomb structure 10 is not particularly limited as long as it presents a pillar shape, and it may be, for example, a shape such as a pillar shape with circular end faces (cylindrical shape), a pillar shape with oval shaped end faces, and a pillar shape with polygonal (quadrangular, pentagonal, hexagonal, heptagonal, octagonal, and the like) end faces, and the like. Further, for the size of the honeycomb structure 10, the honeycomb structure preferably has an area of end faces of from 2000 to 20000 $mm^2$, and more preferably from 5000 to 15000 $mm^2$, in order to increase heat resistance (suppressing cracks generated in a circumferential direction of the outer peripheral wall).

The shape of each cell 15 of the honeycomb structure 10 in a cross section perpendicular to the extending direction of the cells 15 is not limited, but it may preferably be a quadrangle, a hexagon, an octagon, or a combination thereof. Among these, the quadrangle and hexagon are preferable in terms of easily achieving both structural strength and uniformity of heating.

The partition wall 13 that defines the cells 15 preferably has a thickness of from 0.1 to 0.3 mm, and more preferably from 0.15 to 0.25 mm. As used herein, the thickness of the partition wall 13 is defined as a length of a portion passing through the partition wall 13, among line segments connecting centers of gravity of the adjacent cells 15 in the cross section perpendicular to the extending direction of the cells 15.

The honeycomb structure 10 preferably has a cell density of from 40 to 150 cells/$cm^2$, and more preferably from 70 to 100 cells/$cm^2$ in the cross section perpendicular to the flow path direction of the cells 15. The cell density in such a range can increase purification performance of the catalyst while reducing a pressure loss upon flowing of an exhaust gas. The cell density is a value obtained by dividing the number of cells by an area of one end face of the honeycomb structure 10 excluding the outer peripheral wall 12.

The provision of the outer peripheral wall 12 is useful in terms of ensuring the structural strength of the honeycomb structure 10 and preventing a fluid flowing through the cells 15 from leaking from the outer peripheral wall 12. More particularly, the thickness of the outer peripheral wall 12 is preferably 0.05 mm or more, and more preferably 0.1 mm or more, and even more preferably 0.2 mm or more. However, if the outer peripheral wall 12 is too thick, the strength becomes too high, so that a strength balance between the outer peripheral wall 12 and the partition wall 13 is lost to reduce thermal shock resistance. Therefore, the thickness of the outer peripheral wall 12 is preferably 1.0 mm or less, and more preferably 0.7 mm or less, and still more preferably 0.5 mm or less. As used herein, the thickness of the outer peripheral wall 12 is defined as a thickness of the outer peripheral wall 12 in a direction of a normal line to a tangential line at a measurement point when observing a portion of the outer peripheral wall 12 to be subjected to thickness measurement in the cross section perpendicular to the extending direction of the cells.

The honeycomb structure 10 may be provided with a pair of electrode portions 14a, 14b arranged so as to face each other across a central axis of the honeycomb structure 10, on the surface of the outer peripheral wall 12. Each of the electrode portions 14a, 14b is electrically connected to the honeycomb structure 10. This structure can allow the honeycomb structure 10 to suppress a bias of a current flowing through the honeycomb structure 10 when a voltage is applied, whereby a bias of a temperature distribution in the honeycomb structure 10 can be suppressed. A shape and size of each of the electrode portions 14a, 14b are not particularly limited, but they can be designed as needed, depending on the size of the honeycomb structure 10 and/or electrical conduction performance. For example, each of the electrode portions 14a, 14b may be provided in a band shape extending in the extending direction of the cells 15 of the honeycomb structure 10.

The electrode portions 14a, 14b are formed of a conductive material. The electrode portions 14a, 14b are preferably made of an oxide ceramic or a mixture of a metal or a metal compound with an oxide ceramic. The metal may be either a single metal or an alloy, and for example, silicon, aluminum, iron, stainless steel, titanium, tungsten, a Ni—Cr alloy, or the like can be suitably used. Examples of the metal compound include compounds other than oxide ceramics, such as metal oxides, metal nitrides, metal carbides, metal silicides, metal borides, and composite oxides. For example, $FeSi_2$, $CrSi_2$, alumina, silica, titanium oxide or the like can be suitably used. Each of the metal and the metal compound may be used alone or in combination of two or more. Specific examples of the oxide ceramic include glass, cordierite, and mullite. The glass may further contain an oxide composed of at least one component selected from B, Mg, Al, Si, P, Ti and Zr. It is more preferable to further contain an oxide(s) consisting of any of the above components in that the strength of the electrode portions 14a, 14b is further improved. It is more preferable that a material forming the electrode portions 14a, 14b contains: particles including one or more selected from silicon carbide, silicon nitride, and aluminum nitride; and silicon doped with at least one dopant, as with the material forming the honeycomb structure 10 as described above. According to this configuration, the electrode portions 14a, 14b are made of the same material as that of the honeycomb structure 10, so that an interface between a honeycomb substrate and the electrode portions is eliminated and strength is improved. It is more preferable that the electrode portions 14a, 14b contain silicon carbide and silicon doped with the dopant.

<Method for Producing Honeycomb Structure>

The production of the honeycomb structure 10 can be carried out according to a method for producing a honeycomb structure in the known method for producing the honeycomb structure. For example, the honeycomb structure 10 can be produced according to the method described below.

For example, first, a binder, a surfactant, water and the like are added to ceramic powder containing silicon carbide powder to form a forming raw material.

Examples of the binder include methyl cellulose, hydroxypropyl methyl cellulose, hydroxypropoxyl cellulose, hydroxyethyl cellulose, carboxymethyl cellulose, polyvinyl alcohol and the like. Among these, it is preferable to use methyl cellulose in combination with hydroxypropoxyl cellulose. The content of the binder is preferably from 2.0 to 10.0 parts by mass, per 100 parts by mass of the ceramic powder containing silicon carbide.

The content of water is preferably from 20 to 60 parts by mass per 100 parts by mass of the ceramic powder containing silicon carbide.

The surfactant that can be used herein includes ethylene glycol, dextrin, fatty acid soaps, polyalcohol and the like. These may be used alone or in combination of two or more. The content of the surfactant is preferably from 0.1 to 2.0 parts by mass per 100 parts by mass of the ceramic powder containing silicon carbide powder.

A pore former may be added to the extent that it does not affect the porosity of the present invention. Examples of the pore former include starch, foamed resins, and water absorbing resins.

The resulting forming raw materials are then kneaded to form a green body, and the green body is then extruded to prepare a raw (unfired) honeycomb formed body. In the extrusion, a die having a desired overall shape, cell shape, partition wall thickness, cell density and the like can be used.

The resulting honeycomb formed body is then dried and degreased to produce a honeycomb degreased body. The degreasing step can be carried out in an air atmosphere, an inert atmosphere or a reduced pressure atmosphere at a temperature of from 400 to 500° C. Subsequently, the honeycomb degreased body can be impregnated with silicon (metal silicon) and fired in an inert gas under reduced pressure or in vacuum to obtain a honeycomb structure. By silicon doped with the dopant and/or a dopant source added to the forming raw material, the amount of the dopant is appropriately adjusted depending on the dopant elements such that the concentration of the dopant in silicon is $1\times10^{16}$ to $5\times10^{20}/cm^3$ in the honeycomb structure 10.

As described above, the pillar shaped honeycomb structure having the cells defined by the partition wall can be obtained by impregnating and firing of the honeycomb degreased body with silicon doped with the dopant or the dopant source in the honeycomb degreased body in an inert atmosphere under reduced pressure or in vacuum. By the impregnating and firing, the pores in the honeycomb degreased body are filled with molten silicon which is then solidified, so that the porosity of the honeycomb structure of 30% or less can be achieved. The inert atmosphere includes a nitrogen gas atmosphere, a noble gas atmosphere such as argon, or a mixed gas atmosphere of these. The impregnating and sintering method of silicon includes a method for firing a lump containing silicon and the honeycomb degreased body such that they are arranged so as to come into contact with each other.

The firing temperature is preferably 1350° C. or higher, and more preferably 1400° C. or higher, and even more preferably 1450° C. or higher, in order to perform sufficient sintering. The firing temperature is preferably 2200° C. or lower, and more preferably 1800° C. or lower, and even more preferably 1600° C. or lower, in order to suppress production costs during the firing.

The heating time of the honeycomb degreased body at the above firing temperature is preferably 0.25 hours or more, and more preferably 0.5 hours or more, and even more preferably 0.75 hours or more, in order to perform sufficient sintering. The heating time of the honeycomb degreased body at the above firing temperature is preferably 5 hours or less, and more preferably 4 hours or less, and even more preferably 3 hours or less, in order to reduce the production costs during the firing.

Further, after firing, it is preferable to carry out an oxidation treatment at a temperature of from 1000 to 1350° C. for 1 to 10 hours in order to improve durability. The oxidation treatment means a heat treatment in an oxidizing atmosphere (for example, in the air atmosphere).

Next, the pair of electrode portions 14a, 14b may optionally be arranged so as to face each other across the central axis of the honeycomb structure 10.

<Electrically Heating Support>

Figure 2:
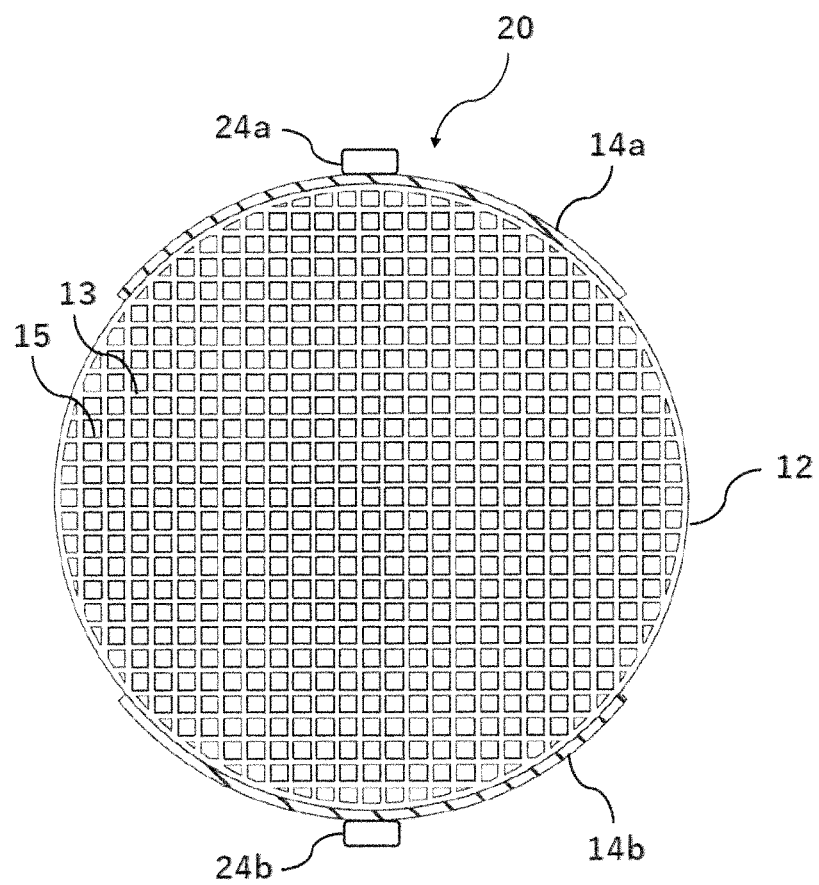
FIG. 2 is a schematic cross-sectional view of an electrically heating support, which is perpendicular to an extending direction of cells according to an embodiment of the present invention.

FIG. 2 is a schematic cross-sectional view of an electrically heating support 20 according to an embodiment of the present invention, which is perpendicular to the extending direction of the cells. The electrically heating support 20 includes the honeycomb structure 10 and a pair of metal terminals 24a, 24b. The pair of metal terminals 24a, 24b are disposed so as to face each other across the central axis of the honeycomb structure 10, and are provided on the pair of electrode portions 14a, 14b, respectively, and electrically connected. Accordingly, as a voltage is applied to the metal terminals 24a, 24b through the electrode portions 14a, 14b, then the electricity is conducted through the metal terminals 24a, 24b to allow the honeycomb structure 10 to generate heat by Joule heat. Therefore, the honeycomb structure 10 can also be suitably used as a heater.

The material of the metal terminals 24a, 24b is not particularly limited as long as it is a metal, and a single metal, an alloy, or the like can be employed. In terms of corrosion resistance, electrical resistivity and linear expansion coefficient, for example, the material may preferably be an alloy containing at least one selected from Cr, Fe, Co, Ni and Ti, and more preferably stainless steel and Fe—Ni alloys. The shape and size of each of the metal terminals 24a, 24b are not particularly limited, but they can be appropriately designed according to the size of the electrically heating support 20, the electrical conduction performance, and the like.

By supporting the catalyst on the electrically heating support 20, the electrically heating support 20 can be used as a catalyst. For example, a fluid such as an exhaust gas from a motor vehicle can flow through the flow paths of the plurality of cells 15. Examples of the catalyst include noble metal catalysts or catalysts other than them. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a NOx storage reduction catalyst (LNT catalyst) containing an alkaline earth metal and platinum as storage components for nitrogen oxides ($NO_x$). Illustrative examples of a catalyst that does not use the noble metal include a NOx selective reduction catalyst (SCR catalyst) containing a copper-substituted or iron-substituted zeolite, and the like. Further, two or more catalysts selected from those catalysts may be used. A method for supporting the catalyst is not particularly limited, and it can be carried out according to a conventional method for supporting the catalyst on the honeycomb structure.

<Exhaust Gas Purifying Device>

The electrically heating support 20 according to the above embodiment of the present invention can be used for an exhaust gas purifying device. The exhaust gas purifying device includes the electrically heating support 20 and a can body for holding the electrically heating support 20. In the exhaust gas purifying device, the electrically heating support 20 can be installed in an exhaust gas flow path for allowing an exhaust gas from an engine to flow. As the can body, a metal tubular member or the like for accommodating the electrically heating support 20 can be used.

EXAMPLES

Hereinafter, Examples are illustrated for better understanding of the present invention and its advantages, but the present invention is not limited to these Examples.

Example 1

<1. Production of Honeycomb Structure>

Silicon carbide (SiC) powder with a bimodal particle size distribution was prepared as a silicon carbide raw material, and boron nitride powder was prepared as a dopant source. The silicon carbide powder and the boron nitride powder were mixed to prepare a ceramic raw material. To the ceramic raw material were then added methyl cellulose and hydroxypropyl methyl cellulose as binders, a water absorbing resin as a pore former, and water to form a forming raw material. The forming raw material was then kneaded by means of a vacuum green body kneader to prepare a cylindrical green body. The average particle diameter of the silicon carbide powder was 20 μm. The average particle diameter of the silicon carbide powder refers to an arithmetic average diameter on a volume basis, when measuring frequency distribution of the particle diameters by the laser diffraction method.

The resulting cylindrical green body was formed using an extruder having a grid-shaped die structure to obtain a cylindrical honeycomb formed body in which each cell had a hexagonal shape in cross section perpendicular to the flow path direction of the cells. The resulting honeycomb formed body was subjected to high-frequency dielectric heating and drying and then dried at 120° C. for 2 hours using a hot air drier to prepare a honeycomb dried body.

After degreasing the honeycomb dried body, silicon (metal silicon) doped with a dopant (boron: B) was impregnated into the honeycomb degreased body in vacuum, and then fired at 1500° C. to obtain a honeycomb fired body. In this case, the concentration of the dopant in the silicon was adjusted such that the values in Table 1 were obtained. The cross-sectional observation using a scanning electron microscope (SEM) confirmed that the resulting honeycomb structure had a matrix-domain structure with silicon carbide particles as a domain and silicon as a matrix, indicating that silicon was present as a continuous layer.

<2. Formation of Electrode Portion>

Silicon carbide (SiC) powder, boron nitride powder, methyl cellulose, glycerin, and water were mixed with a planetary centrifugal mixer to prepare an electrode portion forming paste. When the silicon carbide (SiC) powder was 100 parts by mass, methyl cellulose was 0.5 parts by mass, glycerin was 10 parts by mass, and water was 38 parts by mass. The average particle diameter of the silicon carbide powder was 20 μm. The average particle diameter refers to an arithmetic average diameter on a volume basis when frequency distribution of particle diameters is measured by the laser diffraction method.

The electrode portion forming paste was then applied to the honeycomb fired body with an appropriate area and film thickness by a curved surface printing machine to prepare a honeycomb structure.

Examples 2 to 6

Honeycomb structures were produced in the same method as that of Example 1, with the exception that the concentration of the dopant in silicon was adjusted to each value shown in Table 1.

Examples 7-14, Comparative Example 1

Honeycomb structures were produced in the same method as that of Example 1, with the exception that the mass ratio of silicon carbide (SiC) powder and metal silicon (Si) in the honeycomb structure was appropriately adjusted and the concentration of the dopant in silicon was adjusted to each value shown in Table 1.

Comparative Example 2

Silicon powder, silicon carbide powder and boron nitride were mixed to prepare a ceramic raw material. To the ceramic raw material were added hydroxypropyl methyl cellulose as a binder, a water absorbing resin as a pore former, and water to form a forming raw material. The forming raw material was then kneaded by means of a vacuum green body kneader to prepare a cylindrical green body. The content of water was 42 parts by mass per 100 parts by mass of the total of the silicon powder and the silicon carbide powder.

The resulting cylindrical green body was formed using an extruder to obtain a unfired pillar shaped honeycomb structure portion in which each cell had a square cross-sectional shape. The resulting unfired pillar shaped honeycomb structure portion was subjected to high-frequency dielectric heating and drying and then dried at 120° C. for 2 hours using a hot air drier, and a predetermined amount of both end faces were cut to prepare a honeycomb structure.

The dried honeycomb structure was then degreased (calcined), fired and further oxidized to obtain a honeycomb fired body. The degreasing was carried out at 550° C. for 3 hours. The firing was carried out in an argon atmosphere at 1400° C. for 2 hours. The oxidation was carried out at 1300° C. for 1 hour.

<3. Porosity>

The porosity of each honeycomb structure was measured by image analysis of the cross-sectional observation results by SEM. Specifically, from a plurality of cross-sectional observation photographs of the honeycomb structure (four for each of the Examples and Comparative Examples) obtained by SEM at magnifications of 500, a total area S2 of the pores in an area S1 of each honeycomb structure was determined in a region having an actual observation area of 0.08 mm$^2$ or more (in each of the Examples and Comparative Examples, 0.1 mm×0.2 mm×4 photographs=0.08 mm$^2$), and the porosity of each honeycomb structure was calculated by the equation: (S2/S1)×100%.

<4. Si, SiC, SiO$_2$ Contents>

For composition amounts of Si, SiC, and SiO$_2$ in the partition wall and the outer peripheral wall of the honeycomb structure, an amount of silicon element and an amount of oxygen element were measured by the fluorescent X-ray method, and an amount of carbon element was measured by the resistance heating infrared absorption method. For the amount of SiC, all carbon elements were assumed to be from SiC, and the amount of SiC in the partition wall and the outer peripheral wall was calculated by molecular weight calculation. For the amount of SiO$_2$, all oxygen elements were assumed to be from SiO$_2$, and the amount of SiO$_2$ in the partition wall and the outer peripheral wall was calculated by molecular weight calculation. For the amount of Si, it was calculated by subtracting the total Si amount of the Si amount in Sic and Si amount in SiO$_2$ based on the amount of SiC and the amount of SiO$_2$ calculated above, from the total silicon element amount measured by the fluorescent X ray method.

<5. Dopant Species and Amount of Dopant in Si>

First, each honeycomb structure was cut along a surface perpendicular to a central axis to expose a cut surface. Irregularities on a cross section of the honeycomb structure were then filled with a resin, and the surface filled with the resin was further polished. The polished surface of the honeycomb structure was then observed, and elemental analysis of a material forming the honeycomb structure was carried out by energy dispersive X-ray spectroscopy (EDX analysis: Energy Dispersive X-ray Spectroscopy).

Subsequently, for a portion of the polished surface which was determined to be "silicon", whether or not boron was contained in the silicon was determined by the following method. First, for the portion where the silicon element was detected, a portion where the element other than silicon was detected was determined as boron by mapping of a cross-sectional structure photograph and an electron probe micro analyzer (EPMA analysis: Electron Probe Micro Analyzer) for the polished surface.

Subsequently, the portion where the silicon element alone or silicon and boron was/were detected by the EPMA analysis and it was determined as "silicon", an amount of boron in silicon was identified by the following method. First, the honeycomb structure including the portion determined as "silicon" was cut into a thickness having a few millimeters, and the cut honeycomb structure was subjected to a cross-section preparation using a Broad Ion Beam method, thereby preparing a sample for measuring the amount of boron. The Broad Ion Beam method is a method for preparing a sample cross section using an argon ion beam. More particularly, it refers to a method for preparing a sample cross section along an end face of a shielding plate by placing the shielding plate directly above the sample, and etching the sample by irradiating it with a broad ion beam of argon from an upper side of the shielding plate. The sample subjected to the cross-sectional preparation was then analyzed for boron in silicon by Time-of-Flight Secondary Ion Mass Spectrometry (TOF-SIMS). In the time-of-flight secondary ion mass spectrometry, the sample was firstly irradiated with a primary ion beam to emit secondary ions from the surface of the sample. The emitted secondary ions were then introduced into a time-of-flight ion mass spectrometer to obtain a mass spectrum of the outermost surface of the sample. The sample was then analyzed based on the obtained mass spectrum, and a concentration of boron in silicon [Dopant Amount] (number/cm$^3$) was determined by converting it based on correlation between a spectral intensity of boron in silicon and measured concentration values previously measured (e.g., a calibration curve).

<6. Volume Resistivity>

The volume resistivity of each honeycomb structure was measured by arranging silver pastes and silver streaks at four positions in the axial direction on each rod-shaped sample cut out from each honeycomb structure, and measuring those by the four-terminal method.

<7. Thermal Conductivity>

For the thermal conductivity of each honeycomb structure, a thermal diffusivity value was measured by an optical AC method, a specific heat value was measured by a differential scanning calorimeter (DSC), and a true density value was measured by am Archimedes method. The product of the measured value of the thermal diffusivity, the measured value of the specific heat, and the measured value of the true density was defined as a thermal conductivity value.

<8. Thermal Shock Resistance>

A heating and cooling test of each honeycomb structure was carried out using a propane gas burner tester including: a metal casing for housing the honeycomb structure; and a propane gas burner capable of feeding a heating gas into the metal casing. The heating gas was a combustion gas generated by burning a propane gas with a gas burner (propane gas burner). Then, the thermal shock resistance was evaluated by confirming whether or not cracks were generated in the honeycomb structure by the above heating and cooling test. Specifically, first, the resulting honeycomb structure was stored (canned) in the metal casing of the propane gas burner tester. A gas (combustion gas) heated by the propane gas burner was then fed into the metal casing so as to pass through the honeycomb structure. The temperature conditions (inlet gas temperature conditions) for the heating gas flowing into the metal casing were as follows. First, the temperature was increased to a designated temperature in 5 minutes, maintained at a designated temperature for 10 minutes, then cooled to 100° C. in 5 minutes, and maintained at 100° C. for 10 minutes. Such a series of operations of increasing, cooling, and maintaining the temperature is referred to as "heating and cooling operation". After that, cracks in the honeycomb structure were confirmed. The above "heating and cooling operation" was then repeated while increasing the designated temperature from 825° C. by 25° C. The thermal shock resistance of the honeycomb structure was evaluated based on the following evaluation criteria:

Evaluation AA: No cracks were generated at the designated temperature of 1000° C.;

Evaluation A: No cracks were generated at the designated temperature of 950° C. to 975° C., but cracks were generated at 1000° C.; and Evaluation B: No cracks were generated at the designated temperature of 900° C. to 925° C., but cracks were generated at 950° C.

TABLE 1

| | | Content | | | Dopant in Si | | Volume | Thermal | Thermal |
|---|---|---|---|---|---|---|---|---|---|
| | Porosity % | Si % by mass | SiC % by mass | $SiO_2$ % by mass | Dopant Species | Dopant Amount Number/$cm^3$ | Resistivity $\Omega$cm | Conductivity W/mK | Shock Resistance |
| Example 1 | 2 | 44 | 55 | 1 | B | $3 \times 10^{20}$ | 0.002 | 90 | AA |
| Example 2 | 2 | 44 | 55 | 1 | B | $2 \times 10^{20}$ | 0.002 | 100 | AA |
| Example 3 | 2 | 44 | 55 | 1 | B | $5 \times 10^{19}$ | 0.020 | 150 | AA |
| Example 4 | 2 | 44 | 55 | 1 | B | $1 \times 10^{18}$ | 0.246 | 150 | AA |
| Example 5 | 2 | 44 | 55 | 1 | B | $1 \times 10^{17}$ | 1.700 | 150 | AA |
| Example 6 | 2 | 44 | 55 | 1 | B | $2 \times 10^{16}$ | 12.212 | 150 | AA |
| Example 7 | 2 | 50 | 49 | 1 | B | $2 \times 10^{20}$ | 0.002 | 100 | AA |
| Example 8 | 2 | 57 | 42 | 1 | B | $2 \times 10^{20}$ | 0.002 | 91 | AA |
| Example 9 | 2 | 67 | 32 | 1 | B | $2 \times 10^{20}$ | 0.001 | 79 | AA |
| Example 10 | 0 | 35 | 65 | 0 | B | $5 \times 10^{19}$ | 0.020 | 120 | AA |
| Example 11 | 1 | 35 | 65 | 0 | B | $5 \times 10^{19}$ | 0.020 | 117 | AA |
| Example 12 | 5 | 32 | 68 | 0 | B | $5 \times 10^{19}$ | 0.022 | 107 | AA |
| Example 13 | 14 | 27 | 73 | 0 | B | $5 \times 10^{19}$ | 0.040 | 86 | AA |
| Example 14 | 24 | 21 | 79 | 0 | B | $5 \times 10^{19}$ | 0.214 | 51 | A |
| Comp. 1 | 39 | 5 | 95 | 0 | B | $5 \times 10^{19}$ | 120 | 26 | B |
| Comp. 2 | 44 | 46 | 42 | 12 | B | $6 \times 10^{19}$ | 0.050 | 17 | B |

<9. Discussion>

All of the honeycomb structures according to Examples 1 to 14 contained silicon carbide and silicon doped with a dopant (boron), and had a porosity of the honeycomb structure of 30% or less. This resulted in lower resistance, good thermal conductivity and good thermal shock resistance.

Comparative Example 1 had higher resistance due to the lower Si content of 5% by mass, and in addition, it had inferior thermal conductivity and thermal shock resistance to those of Examples 1 to 14.

Comparative Example 2 had inferior thermal conductivity and thermal shock resistance to those of Examples 1 to 14 because the honeycomb structure had a porosity of more than 30%.

DESCRIPTION OF REFERENCE NUMERALS 10 honeycomb structure
12 outer peripheral wall
13 partition wall
14a, 14b electrode portion
15 cell
20 electrically heating support
24a, 24b metal terminal

The invention claimed is:

1. A ceramic honeycomb structure, comprising: an outer peripheral wall; and a partition wall disposed on an inner side of the outer peripheral wall, the partition wall defining a plurality of cells, each of the plurality of cells to form a fluid flow path extending from one end face to other end face, wherein the honeycomb structure contains:
1) Particles comprising one or more selected from silicon carbide, silicon nitride and aluminum nitride; and
2) Silicon doped with a dopant,
wherein the dopant is a Group 13 element or a Group 15 element, and wherein the honeycomb structure has a silicon content of from 20 to 80% by mass, and the honeycomb structure has a porosity of 30% or less.

2. The honeycomb structure according to claim 1, wherein the silicon is present as a continuous layer.

3. The honeycomb structure according to claim 1, wherein an amount of the dopant in the silicon is from $1\times10^{16}$ to $5\times10^{20}/cm^3$.

4. The honeycomb structure according to claim 1, wherein 80% by mass or more of the total mass of the honeycomb structure excluding the silicon content is the particles.

5. The honeycomb structure according to claim 1, wherein the main component of the particles is silicon carbide.

6. The honeycomb structure according to claim 1, wherein the honeycomb structure has a volume resistivity of from 0.001 to 100 Ω·cm.

7. The honeycomb structure according to claim 1, wherein the honeycomb structure has a thermal conductivity of 30 W/m·K or more.

8. An electrically heating support, comprising:
   the honeycomb structure according to claim 1;
   a pair of electrode portions provided on a surface of the outer peripheral wall of the honeycomb structure; and
   metal terminals provided on the pair of electrode portions.

* * * * *